May 5, 1931.   F. A. SIGGINS ET AL   1,804,033
PARTITION FOR AUTOMOBILES
Filed Feb. 4, 1929   3 Sheets-Sheet 1
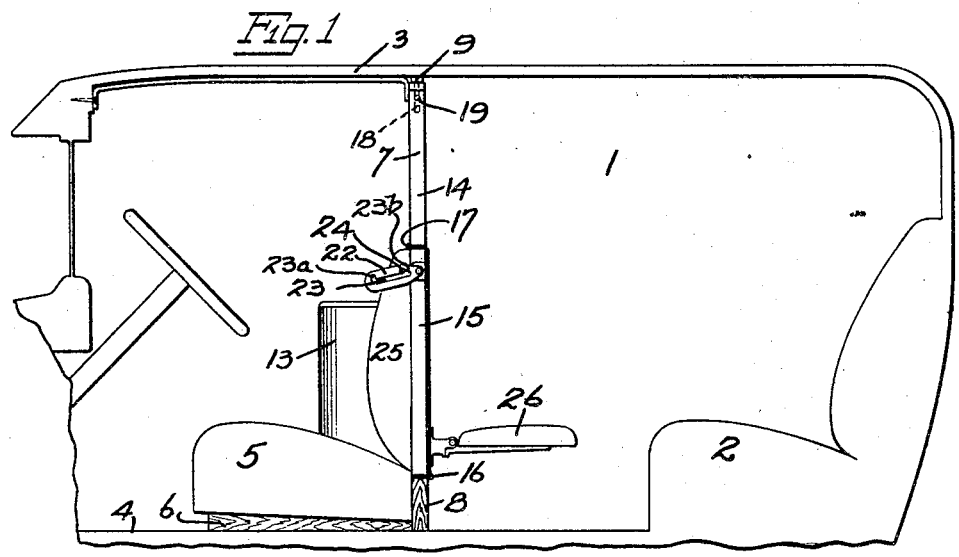
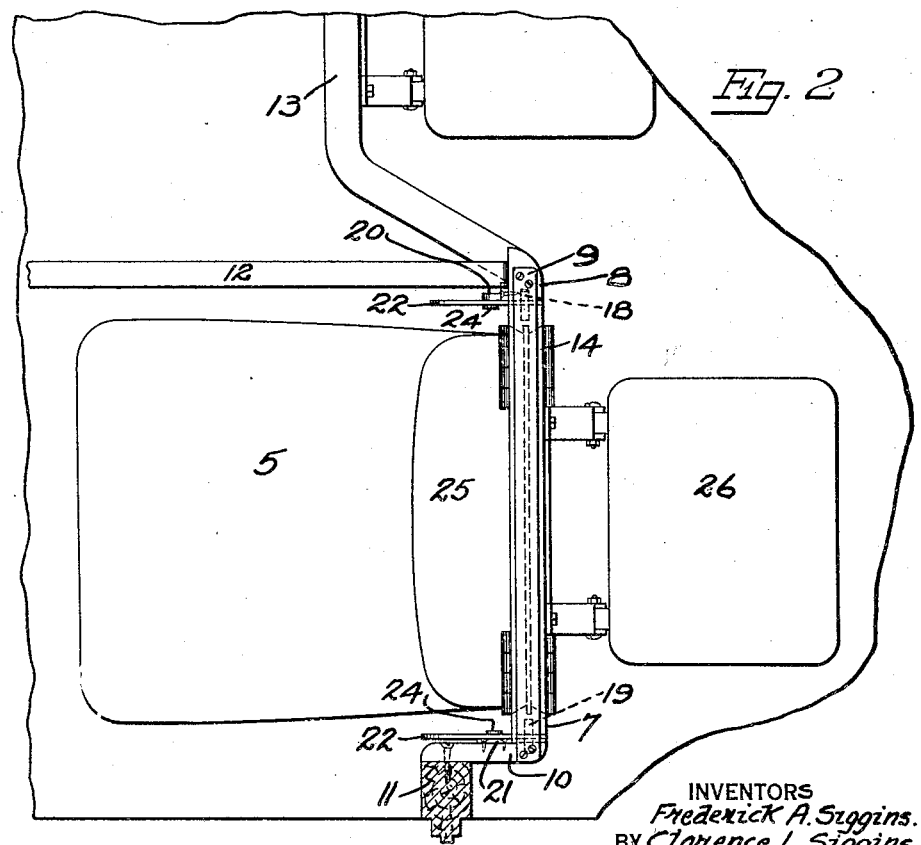
INVENTORS
Frederick A. Siggins.
BY Clarence L. Siggins.
ATTORNEY

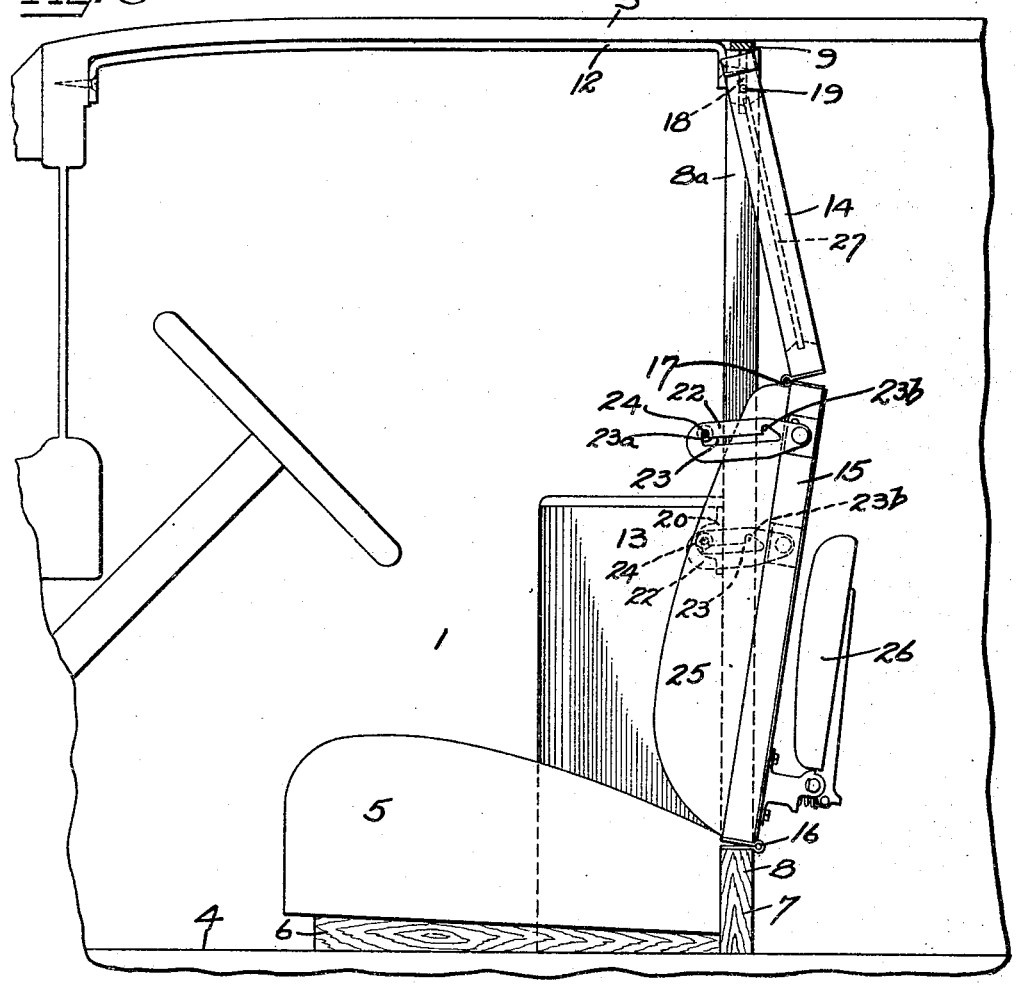
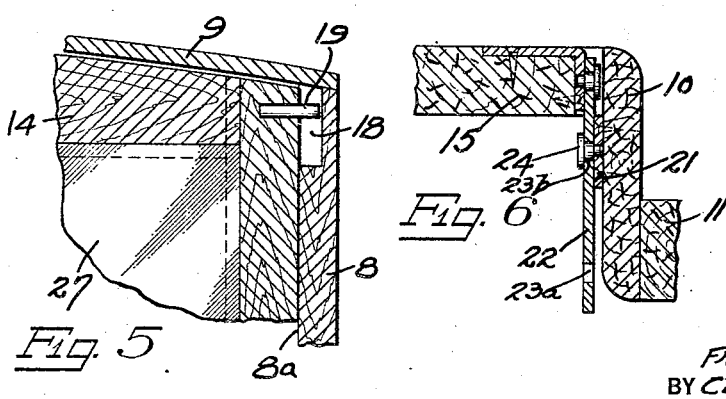

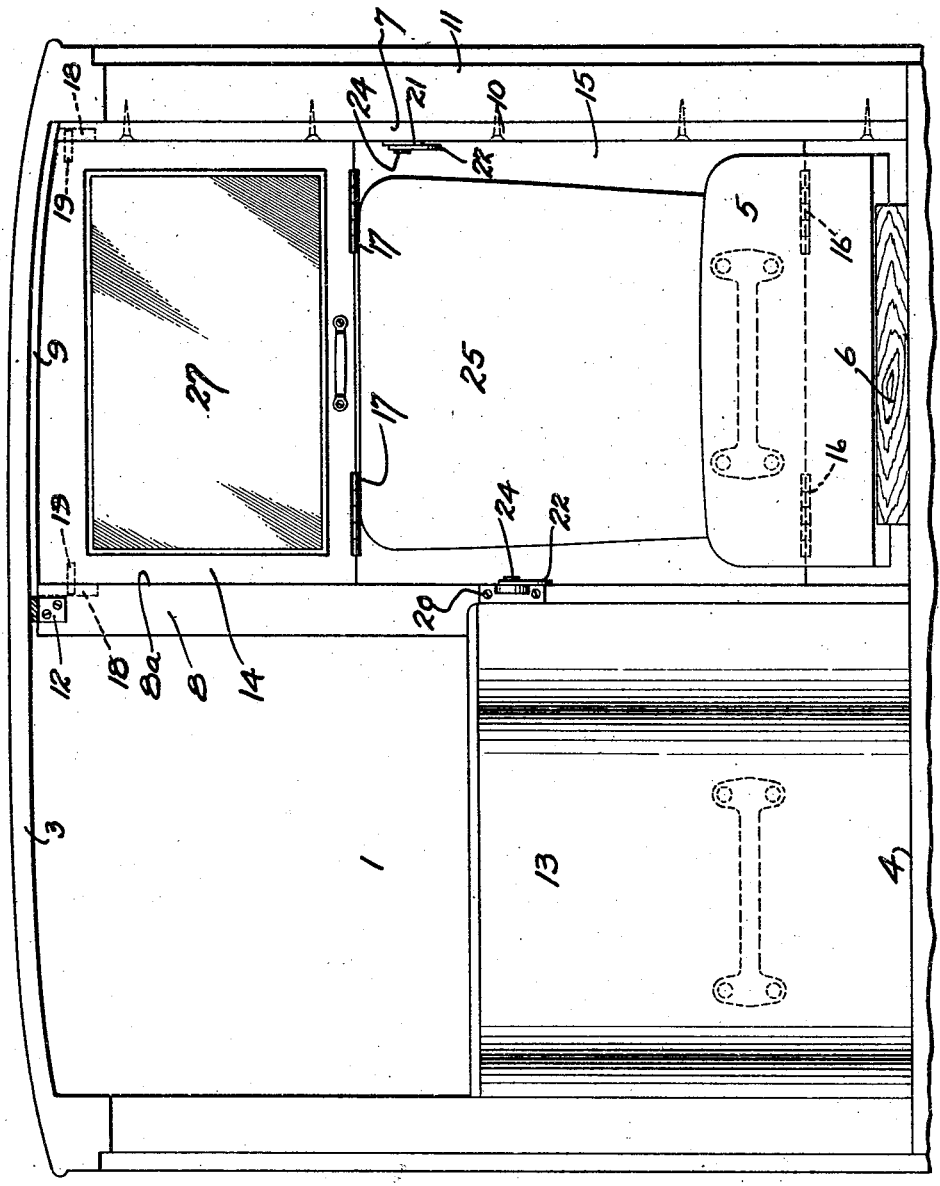

Patented May 5, 1931

1,804,033

UNITED STATES PATENT OFFICE

FREDERICK A. SIGGINS AND CLARENCE L. SIGGINS, OF DETROIT, MICHIGAN

PARTITION FOR AUTOMOBILES

Application filed February 4, 1929. Serial No. 337,208.

This invention relates to improvements in partitions between the front and rear seats of automobiles, and refers more particularly to partitions for taxi-cabs.

It is an object of the invention to provide a partition having a hinged portion therein on which the back behind the driver's seat is arranged; and further to secure a pivotally mounted seat, which may, when required, be utilized for an extra passenger behind the said hinged partition portion. The purpose of the construction is to allow the said hinged portion of the partition to be swung into a rearwardly inclined position so that the driver may enjoy the extra comfort of a reclining back when the extra passenger seat is not in use, and so that the hinged portion and the driver's seat back thereon may be moved into a substantially vertical position when the extra passenger seat is being occupied.

Another object of the invention is to provide a second hinged portion extending between the first named hinged portion and the roof of the car, which assumes a vertical position when the first named hinged portion is vertical, and which assumes an inclined position when the said first named hinged portion is inclined. In this manner clearance is provided for the driver's head when he is taking advantage of the reclining back, and the said upper hinged portion does not interfere with the passenger on the extra seat when that is in use and the hinged portions are in vertical position. The upper hinged portion consists preferably of a frame having glass or other transparent material therein, so as not to obstruct the passengers' vision but to deaden the sound of their voices so as to lessen the possibility of their conversation being overheard by the driver.

Further objects of the invention lie in the provision of simple and effective means for holding the hinged partition portions either in their vertical or inclined positions, and for holding the adjacent ends of these hinged portions in pivotal engagement with one another at all times.

With these and other objects and advantages in view which will become apparent as the specification proceeds, an embodiment of the invention is hereinafter more fully described with the aid of the accompanying drawings, in which:

Figure 1 illustrates a reduced sized elevation of part of an automobile body with its side removed and the partition in position; the hinged portions of the latter are in this view shown vertical.

Figure 2 is a plan view of the partition showing the hinged portions in vertical position and the driver's seat.

Figure 3 is a side view showing the hinged portions of the partition and the back of the driver's seat in inclined position.

Figure 4 is a front elevation of the partition.

Figure 5 and 6 are enlarged details.

Referring to the drawings, 1 designates part of an automobile body having a conventional rear seat 2, roof 3, floor 4 and drivers' seat 5. The latter is supported in any desired manner as by members 6.

The partition 7 consists essentially of a frame 8 the opening 8a in which extends substantially to the top of the former; across the upper side of the frame a brace 9 is usually provided. This frame extends from the floor 4 to the roof 3 and usually substantially halfway across the vehicle. Moreover it is positioned contiguous to the rear side of the driver's seat. The outer side of the frame 8 has a forwardly extending upright 10 secured thereto, which is generally fastened to the post 11 of the vehicle. Secured to the front inner side of the frame 8 and at the top of the latter is a brace 12 which is also fastened to the roof 3 of the vehicle. 13 denotes a continuation of the partition which may be employed to extend across the remainder of the vehicle, as shown in Figure 4. This continuation 13 is usually about half the height of the vehicle body.

14 and 15 indicate upper and lower movable portions mounted in the frame 8. The lower movable portion 15 has its lower margin pivotally mounted, as by hinges 16, to the lower margin of the frame opening 8a so that the said movable portion may be swung rearwardly; and 17 designates hinges by which the adjacent ends of the upper and lower movable portions 14 and 15 are connected. Owing to the hinged connection of the two movable portions 14 and 15 and the fact that the lower portion 15 is mounted pivotally at its end remote from the upper portion provision must be made for the upper portion to drop as it swings into its inclined position with the lower portion. This is accomplished in the following manner: In the upper sides of the frame opening 8a opposed slots 18 are formed. In the sides of the upper movable portion 14 adjacent its upper end pins 19 are inserted which project and engage the slots 18. These pins are so positioned that they occupy the upper ends of their slots when their movable portion 14 is vertical and move downwards in their slots as the movable portion 14 drops.

A bearing 20 is mounted on the front of the frame 8 on its inner side, and against the upright 10 a second bearing 21 is secured. Locking plates 22, pivotally fastened to the sides of the lower movable portion 15, have elongated slots 23 therethrough. At the ends of these slots upwardly extending recesses 23a and 23b are provided. Each bearing 20 and 21 supports a pin 24 which passes through one of the slots 23 thereby limiting the pivotal movement of the movable partition portion 15 in both directions. As the plates 22 are pivotally secured on the portions 15 they tend to fall about their securing means so that when the said portion is moved to its limit in either direction the pins 24 are engaged by the recesses 23a, or 23b, and the said movable portion 15 is held against accidental movement.

25 is a back for the driver's seat 5 which is attached to the front of the movable portion 15; and 26 is a seat provided for an extra passenger immediately behind the partition 7, and, in the present instance, pivotally secured to the rear side of the lower movable portion of the partition. The upper movable portion 14 of the partition usually consists of a window having glass or other transparent material mounted therein as indicated at 27, so that a view of the road ahead is afforded the passengers.

While in the foregoing the preferred embodiment of the invention has been described and shown, it is understood that the invention is susceptible to such modifications and alterations as fall within the scope of the appended claims.

What we claim as our invention and desire to secure by Letters Patent is:

1. A partition of the character described comprising a frame having an opening therein and adapted to extend upwardly from the floor of a vehicle body, means for supporting said frame in said body, a lower movable portion in said frame having its lower end pivotally mounted on said frame adjacent the lower end of said opening, an upper movable portion having its lower margin pivotally attached to the upper margin of said lower movable portion, pivoting means for holding the upper end of said upper movable portion between the sides of said frame opening so that it is permitted movement therein about a horizontal axis, said movable portions being adapted either to assume a substantially vertical position or to be moved so that the upper portion is downwardly and rearwardly inclined and the lower portion is upwardly and rearwardly inclined, a seat back on said lower movable portion, and means for holding said movable portions against accidental movement when in either position.

2. A partition of the character described comprising a vertical frame having an opening therein and adapted to extend upwardly from the floor of a vehicle, means for supporting said frame in said body, an upper movable portion in said frame opening, the upper sides of said opening having slots therein, pivot pins projecting from the sides of said upper movable portion adapted to move vertically in said slots, a lower movable portion in said opening having its lower end pivotally mounted on said frame adjacent the lower end of said opening, the upper and lower movable portions having their adjacent ends pivotally connected to one another, and a seat back on said lower movable portion.

3. A partition of the character described comprising a vertical frame having an opening therein and adapted to extend upwardly from the floor of a vehicle, means for supporting said frame in said body, an upper movable portion in said opening, a lower movable portion in said frame opening, a forwardly extending upright on one side of said frame, a bearing secured to said upright, another bearing on the side of said frame remote from said upright, locking plates on the sides of said lower movable portion having slots therein, pins in said bearings extending through said slots, means for tending to hold said pins at either end of said slots, said lower movable portion being hinged to said frame with its lower margin adjacent the lower end of said opening, the upper end of the lower movable portion being in pivotal engagement with the lower end of the upper movable portion, means for holding the upper end of said upper movable portion in said frame opening so that it is permitted substantially vertical movement therein, and a seat back on said lower movable portion.

4. A partition of the character described comprising a vertical frame having an opening therein and adapted to extend from the floor to the roof of a vehicle, a window in said opening, the sides of the opening having slots therein, pins projecting from said window slidable in said slots, a lower movable portion in said opening under said window having its upper margin hinged to the lower margin of said window, the lower end of said lower movable portion being hinged on said frame adjacent the lower end of said opening, a seat back on said lower movable portion, a seat in front of said seat back, a hinged seat on the side of said lower movable portion opposite to that on which said seat back is attached, a forwardly extending upright on one side of said frame adapted to be secured to one side of the vehicle, a brace extending from the side of the frame remote from said upright adapted to be secured to the vehicle roof, pivotally mounted locking plates on the sides of said lower movable portion, a bearing on said frame, a bearing on said upright, pins in said bearings engaging said locking plates, and means in said locking plates for engaging said pins when said lower movable member is in either a vertical or an inclined position.

FREDERICK A. SIGGINS.
CLARENCE L. SIGGINS.